US009036940B1

(12) United States Patent
Mundhenk (10) Patent No.: US 9,036,940 B1
(45) Date of Patent: May 19, 2015

(54) METHODS AND SYSTEMS FOR VIDEO NOISE REDUCTION (75) Inventor: Terrell Nathan Mundhenk, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 580 days.

(21) Appl. No.: 12/909,434

(22) Filed: Oct. 21, 2010

(51) Int. Cl.
*G06K 9/00* (2006.01)
*G06T 5/00* (2006.01)
*G06K 9/40* (2006.01)

(52) U.S. Cl.
CPC .. *G06T 5/002* (2013.01); *G06K 9/40* (2013.01)

(58) Field of Classification Search
CPC ............... G06T 5/002; G06T 2207/20182; H04N 5/3651; H04N 5/21; G06K 9/40
USPC ................................................ 382/254, 275
See application file for complete search history.

(56) References Cited

U.S. PATENT DOCUMENTS

| 4,729,019 | A * | 3/1988 | Rouvrais ..................... 348/163 |
| 6,157,876 | A * | 12/2000 | Tarleton et al. ................. 701/16 |
| 2002/0064228 | A1* | 5/2002 | Sethuraman et al. .... 375/240.12 |
| 2008/0175508 | A1* | 7/2008 | Bando et al. .................. 382/255 |
| 2009/0103682 | A1* | 4/2009 | Chen et al. ................. 378/98.12 |
| 2010/0008576 | A1* | 1/2010 | Piramuthu ..................... 382/173 |
| 2010/0142786 | A1* | 6/2010 | Degani et al. ................. 382/131 |
| 2011/0052030 | A1* | 3/2011 | Bruder et al. ................. 382/131 |
| 2012/0075505 | A1* | 3/2012 | Van Beek ..................... 348/241 |
| 2012/0076430 | A1* | 3/2012 | Segall .......................... 382/233 |

OTHER PUBLICATIONS

D. Chaudhuri et al., Line Pattern Removal and Enhancement Technique for Multichannel Passive Millimeter Wave Sensor Images, Defense Science Journal, vol. 57, No. 3, May 2007, pp. 315-321.
Russell C. Hardie et al., Scene-based nonuniformity correction with video sequences and registration, Applied Optics, Mar. 10, 2000, vol. 39 No. 8, pp. 1241-1250.
Laurent Itti et al., A Principled Approach to Detecting Surprising Events in Video, Proc. IEEE International Conference on Computer Vision and Pattern Recognition (CVPR), Jun. 2005, 7 pages.
Laurent Itti et al., Bayesian Surprise Attracts Human Attention, Proc. Neural Information Processing Systems (NIPS 2005), 8 pages.
T. Nathan Mundhenk et al., Automatic computation of an image's statistical surprise predicts performance of human observers on a natural image detection task, Vision Research, 49 (2009) pp. 1620-1637.
Jens-Rainer Ohm, Three-Dimensional Subband Coding with Motion Compensation, IEEE Transactions on Image Processing, vol. 3, No. 5, Sep. 1994, pp. 559-571.

* cited by examiner

*Primary Examiner* — Kim Vu
*Assistant Examiner* — Michael Vanchy, Jr.
(74) *Attorney, Agent, or Firm* — Armstrong Teasdale LLP (57) ABSTRACT

Methods and apparatus for use in reducing noise in one or more video frames. An expected value corresponding to each area (e.g., pixel) of a plurality of areas within the video frame is determined. A surprise value associated with each area is calculated based at least in part on the expected value and an actual value corresponding to the area. The surprise value represents a divergence of the actual value from the expected value. The response of one or more noise filters is attenuated with respect to a first area of the plurality of areas based on the surprise value associated with the first area.

17 Claims, 11 Drawing Sheets

METHODS AND SYSTEMS FOR VIDEO NOISE REDUCTION

BACKGROUND

The field of the disclosure relates generally to video noise reduction and more specifically, to methods and systems for applying video noise filters.

At least some known video systems acquire data from an imaging sensor and produce a video signal based on the data. For example, the data may be sampled periodically to create frames of data, and the frames may be combined to create a video. Some known video systems may also apply one or more noise reduction filters, such as a high-pass filter, to each frame to improve the quality of the video signal.

However, known methods of noise reduction apply to an entire frame without regard to the content of the frame and without regard to previous frames. Accordingly, a significant feature, such as a suddenly-appearing object, may be incorrectly filtered (e.g., softened or blurred), hindering the ability of an observer to detect the feature. Further, some types of imaging sensors, such as passive millimeter wavelength (PMMW) sensors, produce significant amounts of noise that cannot be removed by known filtering methods without imposing a substantial loss of video fidelity. Such limitations may negatively affect the ability of a human or automated operator to pilot a vehicle using imaging sensors, for example.

BRIEF DESCRIPTION

In one aspect, a method for use in reducing noise in a video that includes a series of frames is provided. The method includes determining an expected value corresponding to each area of a plurality of areas within a first frame of the series of frames. A surprise value associated with each area of the plurality of areas is calculated based at least in part on the expected value and an actual value corresponding to the area. The surprise value represents a divergence of the actual value from the expected value. A response of a noise filter is attenuated with respect to a first area of the plurality of areas based on the surprise value associated with the first area.

In another aspect, a device for use in reducing noise in a video is provided. The device includes a storage device that is configured to store a series of frames associated with the video. Each frame of the series of frames includes a plurality of pixels. The device also includes a processor unit that is coupled to the storage device and programmed to calculate a surprise value associated with each pixel of the plurality of pixels in a first frame of the series of frames. The surprise value represents a divergence of an actual value of the pixel from an expected value of the pixel. The processor is also programmed to attenuate a response of a noise filter with respect to a first pixel of the plurality of pixels based on the surprise value associated with the first pixel.

In yet another aspect, one or more computer readable media having computer-executable components are provided. The components include a noise filter component and an attenuation component. When executed by at least one processor unit, the noise filter component causes the at least one processor unit to calculate a noise mask representing noise within a video frame. The noise mask includes a plurality of pixels corresponding to a plurality of pixels within the video frame. When executed by at least one processor unit, the attenuation component causes the at least one processor unit to calculate a surprise value associated with each pixel of the plurality of pixels in the video frame. The surprise value represents a divergence of an actual value of the pixel from an expected value of the pixel. The attenuation component further causes the at least one processor unit to attenuate the noise mask based on the surprise values associated with the pixels within the video frame. The attenuated noise mask is subtracted from the video frame to create a noise-reduced frame.

The features, functions, and advantages that have been discussed can be achieved independently in various embodiments or may be combined in yet other embodiments further details of which can be seen with reference to the following description and drawings.

DETAILED DESCRIPTION

Embodiments provided herein facilitate removing complex noise from video, such as, but not limited to, video from a passive millimeter wavelength (PMMW) sensor. Such a video may be composed of a plurality of video frames. For example, the output of an imaging sensor may be repeatedly sampled to create a still image (i.e., a frame) corresponding to each sample. Each frame includes a plurality of pixels. As used herein, an "area" of a frame refers to one or more pixels within a frame. For example, an area may include a single pixel or a plurality of pixels (e.g., a square measuring 2 pixels by 2 pixels).

As used herein, noise within a video, such as a PMMW video, may include shot noise and fixed pattern noise. Shot noise is similar to a "snow" pattern displayed on an analog television. Fixed pattern noise appears in a relatively constant form (e.g., circular or arcuate streaks) and may vary in intensity but move little, if at all, between frames.

Some embodiments calculate a level of surprise using Bayesian estimation, a method for estimating an unknown probability density function over time. For example, information from a current frame and one or more previous frames may be used to calculate such Bayesian surprise.

In some embodiments, Bayesian surprise is used with a Bayesian "Gamma prior" model to model visually interesting aspects of input data, which are most likely to be noticed by a human observer. The Gamma prior represents a prior probability distribution and may also help to model what is shot noise and to distinguish shot noise from aspects that represent an interesting feature within a frame or a video. In an exemplary embodiment, the Bayesian surprise and/or Gamma prior are used to attenuate filter activity (e.g., shot noise filtering) at important areas of the video frames, facilitating reducing blurring in areas where such blurring would be most noticed.

Fixed pattern noise may be addressed with a combination of non-uniformity correction (NUC) and a targeted Eigen image wavelet transformation (EIWT). These filters may be applied in series, with the EIWT removing noise from the video images, and the NUC filter removing additional noise as well as artifacts produced by the EIWT.

In some embodiments, the methods described herein are performed on data from one or more imaging sensors in real time. Such embodiments enable a human observer or operator to view live video from imaging sensors, such as PMMW sensors, with surprise-enhanced noise reduction applied. Moreover, when applied to a PMMW sensor, embodiments provided herein enable piloting and otherwise operating a vehicle in visibility-limiting conditions, such as fog, rain, smoke, and dust.

Figure 1:
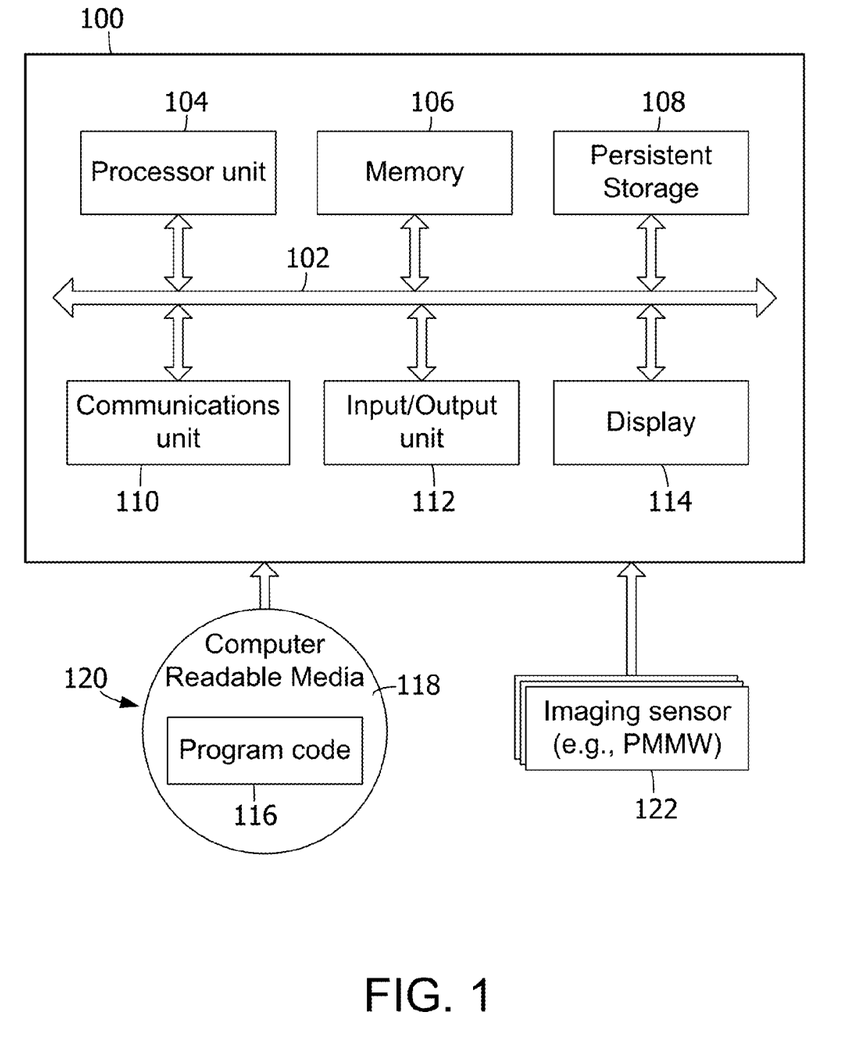
FIG. 1 is a block diagram of an exemplary computer system.

FIG. 1 is a block diagram of an exemplary computer system 100. In the exemplary embodiment, computer system 100 includes communications fabric 102 that provides communications between a processor unit 104, a memory 106, persistent storage 108, a communications unit 110, an input/output (I/O) unit 112, and a presentation interface, such as a display 114. In addition to, or in the alternative, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. In addition, processor unit 104 may be implemented using one or more heterogeneous processor systems in which a main processor is used with secondary processors on a single chip. In another embodiment, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store executable instructions, video frames, parameters, calculated results of mathematical functions, and/or any other data suitable for use with the methods described herein.

Communications unit 110, in these examples, provides for communications with other computer systems or devices. In the exemplary embodiment, communications unit 110 is a network interface card. Communications unit 110 may provide communications through the use of either or both physical and wireless communication links.

Input/output unit 112 enables input and output of data with other devices that may be connected to computer system 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for an operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to computer system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computer system 100. The tangible form of computer readable media 118 is also referred to as computer recordable storage media. In some instances, computer readable media 118 may not be removable.

Alternatively, program code 116 may be transferred to computer system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or computer system for use within computer system 100. For instance, program code stored in a computer readable storage medium in a server computer system may be downloaded over a network from the server to computer system 100. The computer system providing program code 116 may be a server computer, a workstation, a client computer, or some other device capable of storing and transmitting program code 116.

Program code 116 may be organized into computer-executable components that are functionally related. For example, program code 116 may include a noise filter component, an attenuation component, a video acquisition component, a video display component, and/or any component suitable for the methods described herein. Each component may include computer-executable instructions that, when executed by processor unit 104, cause processor unit 104 to perform one or more of the operations described herein.

The different components illustrated herein for computer system 100 are not meant to provide architectural limitations to the manner in which different embodiments may be implemented. The different illustrative embodiments may be implemented in a computer system including components in addition to or in place of those illustrated for computer system 100. For example, other components shown in FIG. 1 can be varied from the illustrative examples shown.

As one example, a storage device in computer system 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

In some embodiments, one or more imaging sensors 122 are coupled in communication with computer system 100. For example, imaging sensors 122 may be coupled to communications unit 110 or input/output unit 112 via a wired and/or wireless communication medium. Imaging sensor 122 is configured to detect electromagnetic radiation (EMR) within a two-dimensional or three-dimensional spatial area. Imaging sensor 122 may be configured to detect EMR within one or more frequency bands corresponding to visible or invisible EMR.

In an exemplary embodiment, imaging sensor 122 is a passive millimeter wavelength (PMMW) sensor that produces data representing PMMW EMR within an area. The data may be transformed into an image by processor unit 104, which may further combine a series of such images to create a video. Such an image or video may be displayed via display 114, transmitted to another computer system 100 via communications unit 110, and/or stored in memory 106 and/or persistent storage 108. In an exemplary embodiment, processor unit 104 is programmed to apply one or more filters, such as noise reduction filters, to the data received from imaging sensor 122 when creating an image and/or a video, as described in more detail below.

Figure 2:
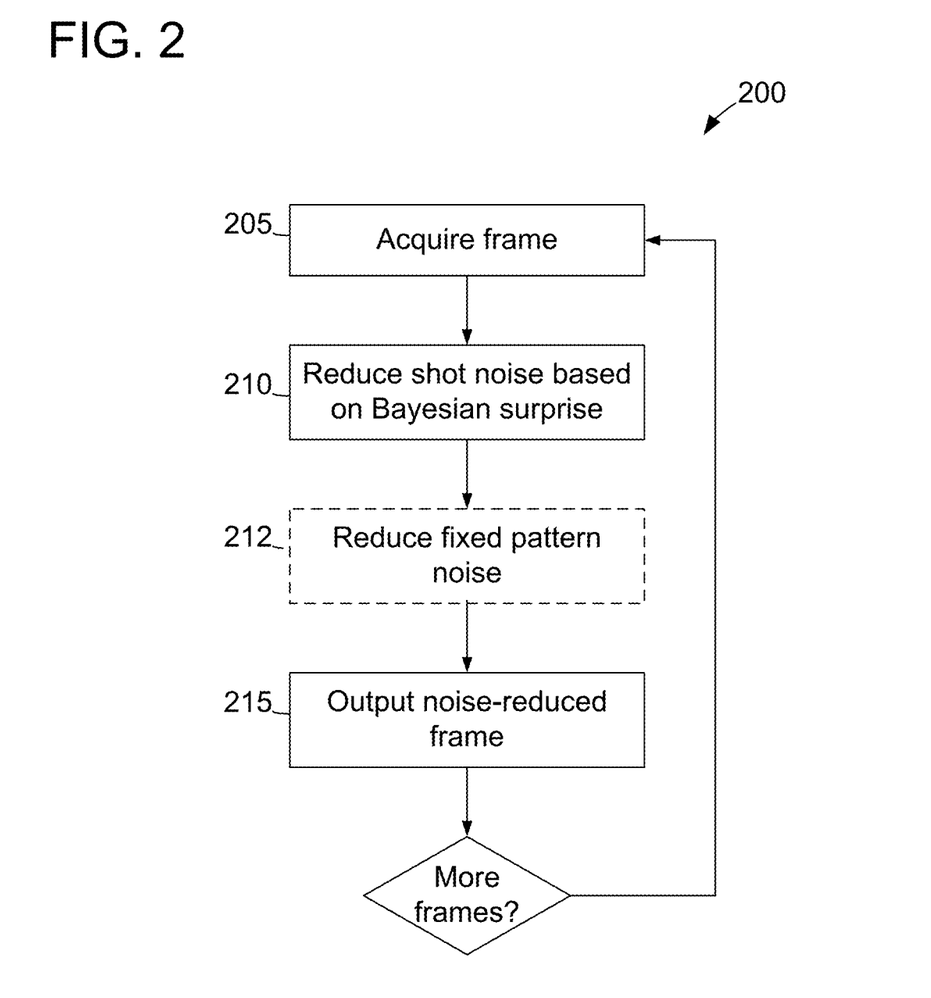
FIG. 2 is a flowchart of an exemplary method for reducing noise in a video that includes a plurality of frames.
Figure 3:
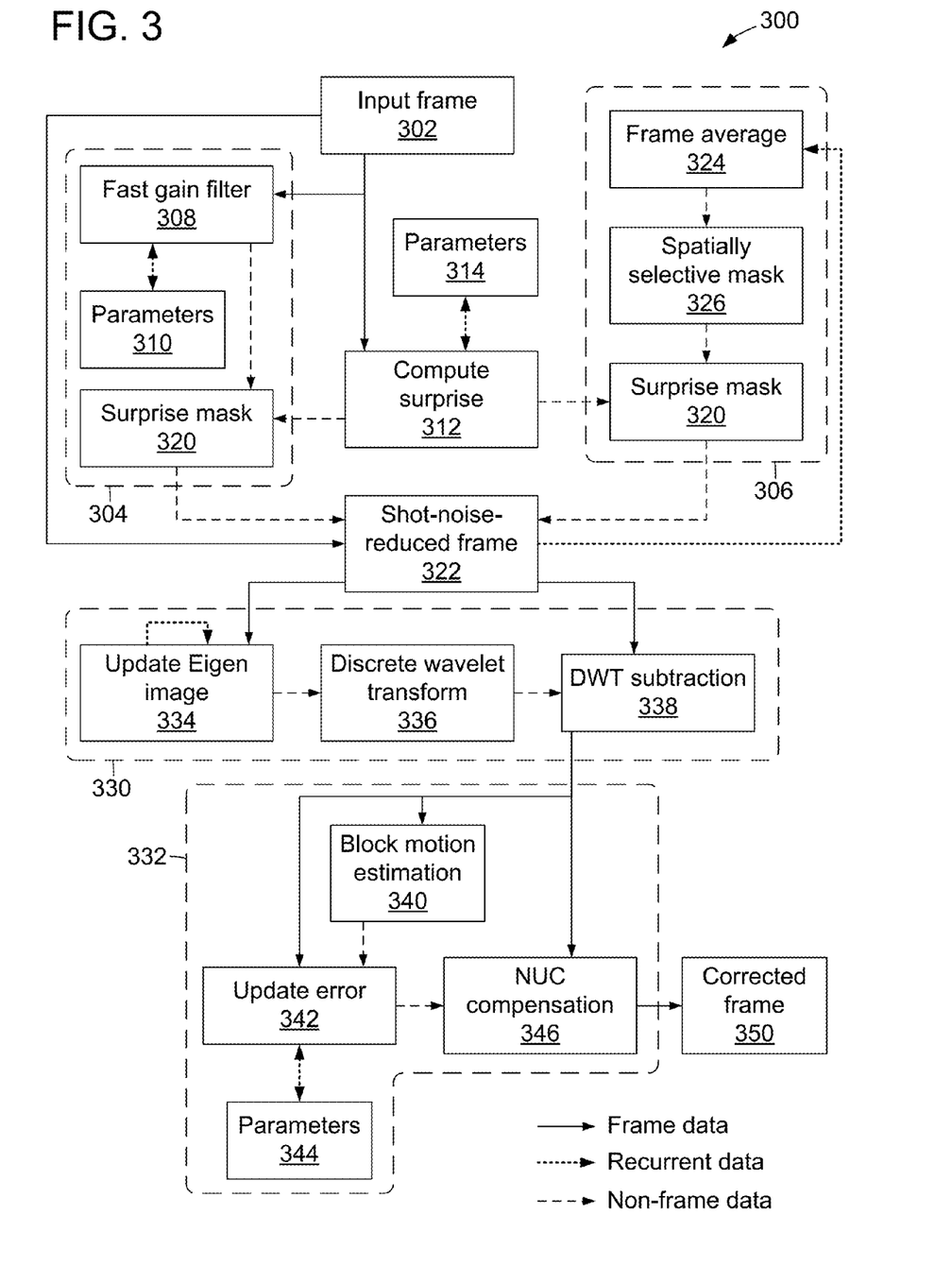
FIG. 3 is a block diagram of data transformations in accordance with one embodiment.
Figure 4:
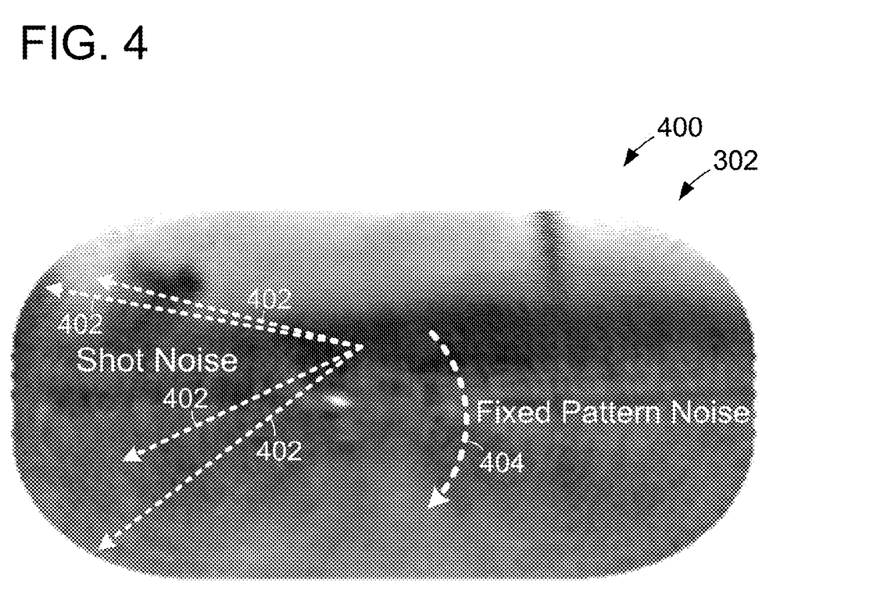
FIG. 4 is an exemplary image representing an input frame.

FIG. 2 is a flowchart of an exemplary method 200 for reducing noise in a video that includes a plurality of frames. FIG. 3 is a block diagram 300 of data transformations in accordance with one embodiment. FIG. 4 is an exemplary image 400 representing an input frame.

Referring to FIGS. 1 and 2, all or a portion of method 200 may be performed by one or more computer systems 100, such as by encoding the operations described as computer-executable instructions and executing the instructions using processor unit 104. Referring to FIGS. 1-3, in an exemplary embodiment, computer system 100 acquires 205 an input frame 302 of a video. For example, input frame 302 may be received from imaging sensor 122, received from another computer system 100 via communications unit 110, or accessed from memory 106 or persistent storage 108.

Referring also to FIG. 4, image 400 represents an exemplary input frame 302. Image 400 includes shot noise, illustrated by radial arrows 402, and fixed pattern noise, illustrated by an arc 404. Shot noise in input frame 302 is reduced 210 based on Bayesian surprise. For example, one or more filters applied to input frame 302 may be attenuated based on a determination of Bayesian surprise value at each pixel, as described in more detail below.

The noise-reduced frame is output 215 by computer system 100. For example, the noise-reduced frame may be stored in memory 106 and/or persistent storage 108, presented via display 114, and/or transmitted to a remote computer system 100 via communications unit 110.

In some embodiments, prior to outputting 215 the noise-reduced frame, computer system 100 also reduces 212 fixed pattern noise in the noise-reduced frame resulting from the reduction 210 of shot noise. Fixed pattern noise reduction 212 is described in more detail below with reference to FIGS. 10-15.

All or portions of method 200 may be performed repeatedly. For example, method 200 may acquire 205 tens to hundreds of input frames 302 per second. Each input frame 302 may be associated with a time t at which the input frame 302 is acquired. The time t may be defined absolutely (e.g., based on calendar time) or relatively (e.g., relative to a first input frame 302 or relative to a current input frame 302). Further, time may be expressed temporally (e.g., as a quantity of milliseconds or microseconds), as a quantity of iterations of method 200, and/or as a quantity of input frames 302. Methods described herein may refer to input frames 302 having different t values, however expressed.

Shot Noise Reduction

Referring to FIGS. 2 and 3, in the exemplary embodiment, shot noise in input frame 302 is reduced 210 based on Bayesian surprise. For example, reducing 210 shot noise may include executing a fast gain filter process 304 and a spatially selective temporal smoothing filter process 306.

Fast gain filter process 304 includes a fast gain filter 308. Fast gain filter 308 operates on input frame 302 based on the intensity or "gain" of each pixel in input frame 302. For example, fast gain filter 308 may subtract the output of each pixel proportionally to the pixel's gain. Equation 1 is an exemplary gain response function for fast gain filter 308.

$$R_f^t = \frac{(I^t - I^{t-1}) + (R_f^{t-1} \cdot \lambda_f)}{1 + \lambda_f} \quad \text{(Eq. 1)}$$

Each term in Equation 1 is an image, and Equation 1 may be executed as a pixel-wise operation. $R_f^t$ is the response of fast gain filter 308 at time t. $I^t$ is input frame 302 at time t. Previously determined values of $R_f^t$ and $I^t$ are referred to using the term t−1. For example, $I^{t-1}$ and $R_f^{t-1}$ may refer to the input frame 302 and response of fast gain filter 308, respectively, from the most recent iteration of method 200. $\lambda_f$ is a constant decay term for fast gain filter 308 that may be between 0.5 and 0.7. In an exemplary embodiment, $\lambda_f$ is defined as 0.6. Input frame 302 ($I^t$), gain response $R^t_f$, and/or $\lambda_f$ may be stored as parameters 310 for use by fast gain filter 308.

Figure 5:
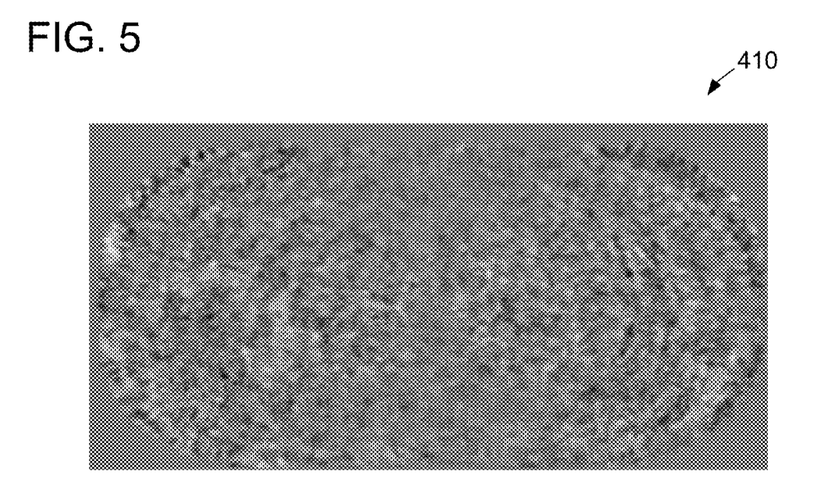
FIG. 5 is an exemplary image that may be output by the fast gain filter shown in FIG. 3.

FIG. 5 is an exemplary image 410 that may be output by fast gain filter 308 (shown in FIG. 3). For example, image 410 may represent shot noise identified by Equation 1. Referring to FIGS. 3-5, in the exemplary embodiment, image 410 is a noise mask that may be subtracted from input frame 302.

The response of fast gain filter 308 is attenuated based on a computation 312 of Bayesian surprise for each area (e.g., pixel) of input frame 302. For example, the value of each pixel in image 410 may be attenuated proportional to a surprise value associated with the corresponding pixel in input frame 302. In an exemplary embodiment, to compute 312 surprise, an updated belief of the value at each pixel is calculated using a Gamma probability distribution function (PDF). The Kullback-Leibler (KL) divergence is used to determine if the observed value of each pixel diverges substantially from expectations. Shot noise is implicit in the Gamma PDF's expectations, so noise produces a relatively low response $R^t_f$.

Surprise may be computed 312 based on one or more parameters 314. Equations 2 and 3 are exemplary functions for determining parameters 314.

$$\alpha' = \alpha - \lambda_s + I^t/\beta \qquad \text{(Eq. 2)}$$

In the exemplary embodiment, $\beta$ is constant and is defined:

$$\beta = \frac{-1}{\lambda_s - 1} \qquad \text{(Eq. 3)}$$

In Equation 3, $\lambda_s$ is a constant decay term that may be between 0.8 and 1.0. In an exemplary embodiment, $\lambda_s$ is defined as 0.9. Further, in an exemplary embodiment, Equation 1 is a pixel-wise operation, and $\alpha$ is calculated (e.g., using Equation 2) for each pixel in input frame 302. $\beta$, $\lambda_s$, and/or $\alpha$ may be stored as parameters 314. For example, because Equation 2 determines a current value ($\alpha'$) based in part on a previous value ($\alpha$), the current value for each pixel may be stored as a parameter 314 for use in a subsequent iteration.

Equation 4 is an exemplary function for computing 312 surprise.

$$S = \alpha' \cdot \log\left(\frac{\beta-1}{\beta}\right) + \log[\Gamma(\alpha')] - \qquad \text{(Eq. 4)}$$
$$\log[\Gamma(\alpha)] + \beta \cdot \left(\frac{\alpha}{\beta-1}\right) - \alpha + (\alpha - \alpha') \cdot \Psi(\alpha)$$

The $\Gamma$ function is a gamma function (not to be confused with the gamma probability distribution function) and $\Psi$ is the digamma (second order poly gamma). Both may be approximated using basic recursive techniques and may be referred to as gammaln (log gamma) and psi functions, respectively, which may be provided by some mathematical software and/or executable libraries. Defining Equation 4 with two log functions rather than one log function with division facilitates invoking such functions, when available.

Surprise S gives a response from zero to infinity and may, to some degree, reflect some portion of shot noise within input frame 302. To compensate, S may be normalized and squashed so that it yields values between zero and one. Equation 5 is an exemplary function for normalizing S.

$$N_s = \text{clamp}\left(\frac{S - \min(S)}{c_{max} - \min(S)}, 0, 1\right) \qquad \text{(Eq. 5)}$$

Equation 5 forces all values above 1 to be 1 and all values below 0 to be 0. However, in an exemplary embodiment, the surprise image S will never have a value less than 0. The constant $c_{max}$ is the maximum normalizing value, which may be defined as 0.01 in the exemplary embodiment. $c_{max}$ may define a threshold value below which only noise is surprising. $N_s$ is a normalized surprise image. Equation 6 is an exemplary function for squashing $N_s$.

$$R^t_s = \frac{1}{1 + e^{-a \cdot N_s + b}} \qquad \text{(Eq. 6)}$$

Equation 6 is a logistic sigmoid with constant gain a and offset b. In an exemplary embodiment, a is between 5 and 7 (e.g., equal to 6), and b is between 2 and 4 (e.g., equal to 3). The output is the surprise response $R^t_s$ at time t. $R^t_s$ for each pixel in input frame 302 may be combined to create a surprise mask 320.

Figure 6:
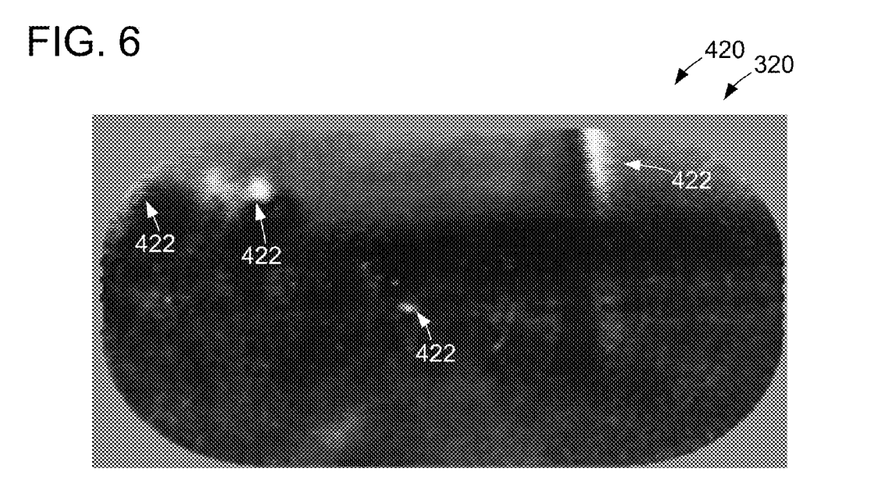
FIG. 6 is an exemplary image representing a surprise mask.

FIG. 6 is an exemplary image 420 representing a surprise mask 320 (shown in FIG. 3). For example, referring to FIGS. 4 and 6, surprise mask 320 may include a pixel indicating the surprise response $R^t_s$ for each pixel in input frame 302. In surprise mask 420, the intensity (e.g., brightness) of each pixel is directly proportional to $R^t_s$ for the pixel. For example, pixels within high-intensity areas 422 are associated with high surprise response values.

Surprise mask 320 may then be subtracted from the output of fast gain filter 308. For example, image 420 may be subtracted from image 410 (shown in FIG. 5). Equation 7 is an exemplary function for subtracting surprise mask 320 from the output of fast gain filter 308.

$$R^t_{f-s} = R^t_f \cdot (1 - R^t_s) \qquad \text{(Eq. 7)}$$

Thus, where surprise response $R^t_s$ is high, the fast gain filter response is reduced in attenuated fast gain filter response $R^t_{f-s}$. $R^t_{f-s}$ for each pixel in input image 302 to create a shot-noise-reduced frame 322.

Figure 7:
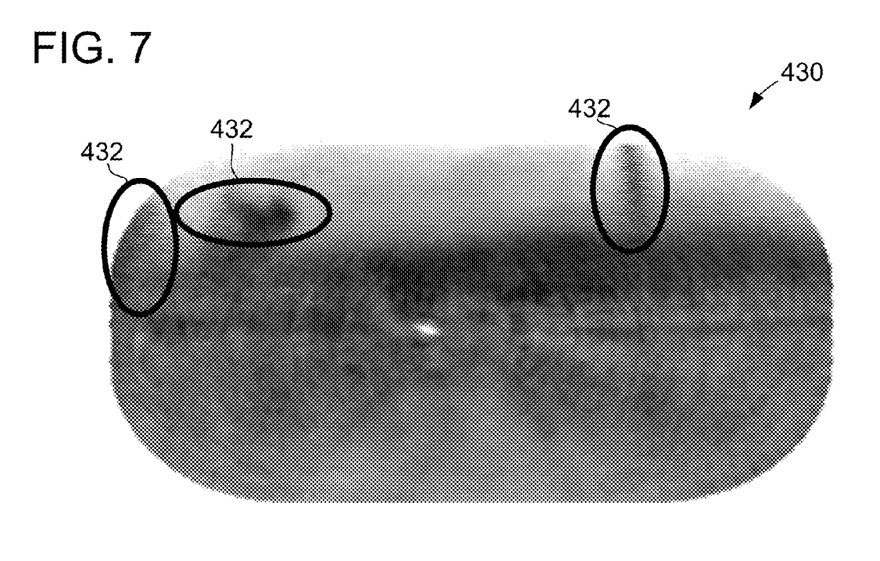
FIG. 7 is an exemplary image illustrating the application of the fast gain filter shown in FIG. 3 to the input frame shown in FIG. 4 without the surprise mask shown in FIG. 6.
Figure 8:
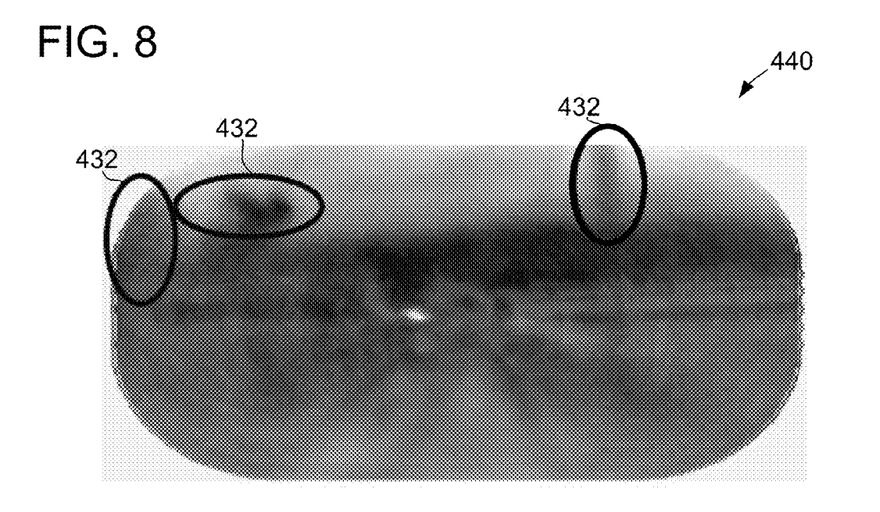
FIG. 8 is an exemplary image illustrating the application of the fast gain filter shown in FIG. 3 to the input frame shown in FIG. 4 when attenuated by the surprise mask shown in FIG. 6.

FIG. 7 is an exemplary image 430 illustrating the application of fast gain filter 308 to input frame 302 without surprise mask 320 (shown in FIGS. 3 and 4). FIG. 8 is an exemplary image 440 illustrating the application of fast gain filter 308 to input frame 302 when attenuated by surprise mask 320. For example, image 440 may be shot-noise-reduced frame 322 (shown in FIG. 3). In the exemplary embodiment, emphasized areas 432 in image 430 and image 440 correspond to high-intensity areas 422 in image 420 (shown in FIG. 6), which are associated with high levels of surprise. Because the response of fast gain filter 308 is attenuated by surprise mask 320 with respect to emphasized areas 432, image 440 displays emphasized areas 432 with decreased filtering artifacts (e.g., blurring) relative to image 430. Referring to FIGS. 2 and 3, in some embodiments, shot-noise-reduced image 322 is output 215 with no further noise filtering.

Referring to FIG. 3, some embodiments facilitate further reduction of shot noise from input frame 302. In the exemplary embodiment, temporal smoothing is applied to shot-noise-reduced frame 322. Spatially selective temporal smoothing filter process 306 creates a frame average 324. In an exemplary embodiment, frame average 324 includes an average of each pixel in a series of input frames 302 over a predetermined time (e.g., t as described above or a different amount of time) or over a predetermined quantity of input frames 302.

Figure 9:
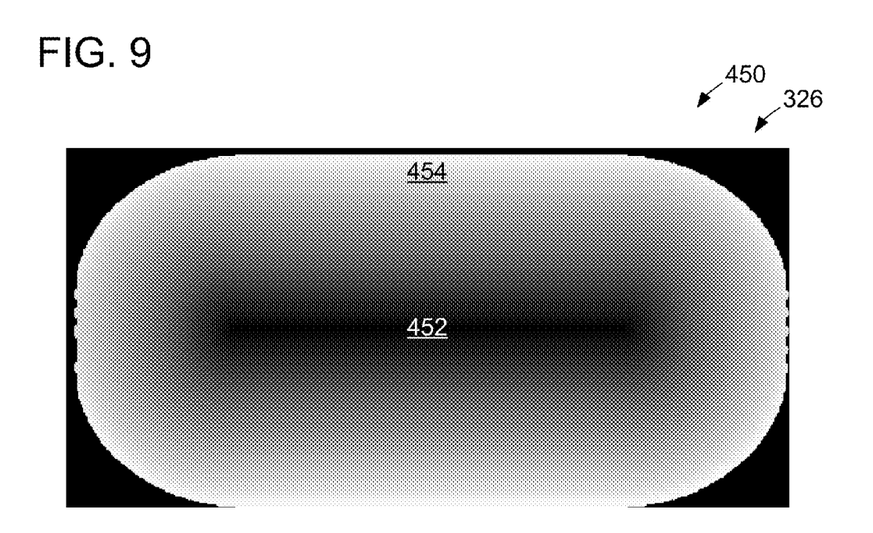
FIG. 9 is an exemplary image of a spatially selective mask that may be used with the spatially selective temporal smoothing filter process shown in FIG. 3.

Frame average 324 is attenuated according to a spatially selective mask 326, denoted as M. FIG. 9 is an exemplary image 450 of a spatially selective mask 326 that may be used with spatially selective temporal smoothing filter process 306. In the exemplary embodiment, M is a constant spatially selective mask 326 having a pill shape and may be referred to as a pill mask 326.

M ranges in value from a minimum decay term to a maximum decay term. In image 450, brightness varies directly with the value of M at each pixel. In the exemplary embodiment, in the center 452 of pill mask 326, the decay term value is small, and little temporal smoothing will be applied. In contrast, at the perimeter 454 of pill mask 326, the decay term value is large, and relatively more temporal smoothing will be applied. In one embodiment, pill mask 326 includes M values ranging from a minimum decay term of 0.5 to a maximum decay term of 1.5.

Spatially selective temporal smoothing filter process 306 may or may not be attenuated by surprise mask 320. Equation 8 is an exemplary function for creating shot-noise-reduced frame 322 using both fast gain filter process 304 and a spatially selective temporal smoothing filter process 306 that is attenuated by surprise mask 320.

$$I_f^t = \frac{(I^t - R_{f-s}^t) + (I_f^{t-1} \cdot (M \cdot (1 - R_s^t)))}{1 + (M \cdot (1 - R_s^t))} \quad \text{(Eq. 8)}$$

The output is the shot noise filtered image $I_f^t$ which may be output 215 (shown in FIG. 2) or subjected to further filtering, as described below.

Fixed Pattern Noise Reduction

Referring to FIGS. 2 and 3, in some embodiments, fixed pattern noise in shot-noise-reduced frame 322 is reduced 212. In one embodiment, reducing 212 fixed pattern noise includes applying a Eigen image wavelet transform (EIWT) process 330 and a non-uniformity correction (NUC) 332.

Figure 10:
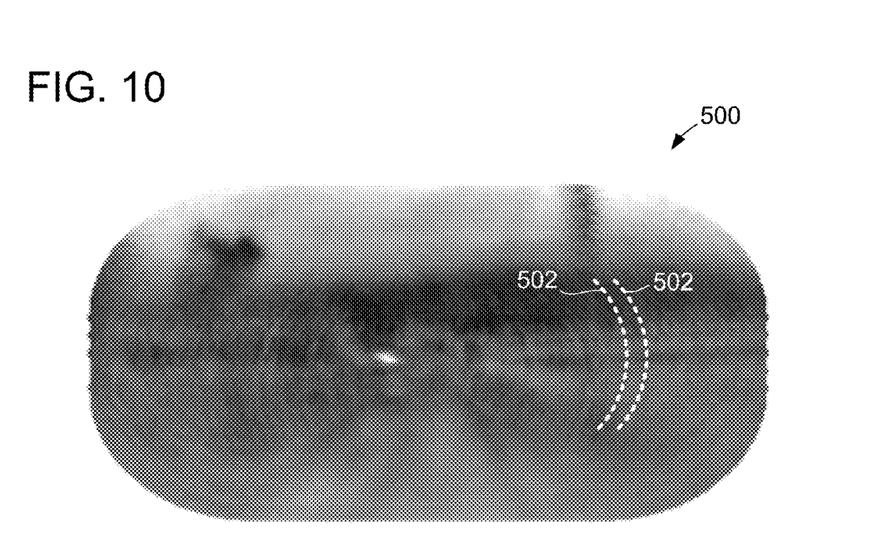
FIG. 10 is an exemplary image, such as the shot-noise-reduced frame shown in FIG. 3, that includes fixed pattern noise.

FIG. 10 is an exemplary image 500 that includes fixed pattern noise. Referring also to FIG. 3, image 500 may be a shot-noise-reduced frame 322. As such, image 500 includes little shot noise but does include fixed pattern noise in the form of ring-like patterns of light areas, denoted with arcs 502.

In an exemplary embodiment, EIWT process 330 is executed to remove relatively wide streaks of noise in shot-noise-reduced frame 322, and NUC 332 is executed to reduce some artifacts such as narrow streaks that may be incompletely reduced by and/or produced by EIWT process 330. In some embodiments, NUC and EIWT are run at different time scales to compensate for fluctuations in fixed pattern noise intensity. In an exemplary embodiment, the EIWT filter has a very long memory (e.g., a relatively large time scale) and insensitivity to quicker changes in fixed pattern noise but, as a result, is less sensitive to spurious variations. Executing the two filters at different times scales facilitates orthogonalizing and reducing the overlap of the action of the filters.

In an exemplary embodiment described in more detail below, EIWT process 330 includes, but is not limited to only including, (1) Computing an Eigen image; (2) Resizing the Eigen image to 1.5 times its original size; (3) Executing a two-dimensional (2D) discrete wavelet transform (DWT) on the resized Eigen image; (4) Isolating the vertical component of the 2D DWT and reducing it to the original Eigen image size; (5) Normalizing the vertical component between 0 and 1; and (6) Subtracting the vertical component from the shot-noise-reduced frame.

In the exemplary embodiment, an average of shot-noise-reduced frames 322, referred to as an Eigen image 334, is created. Eigen image 334 may be a per-pixel decaying average of shot-noise-reduced frames 322.

To execute EIWT process 330 "online" or "live", Eigen image 334 may represent an average of recent shot-noise-reduced frames 322. For example, Eigen image 334 may be created from shot-noise-reduced frames 322 over a predetermined amount of time or a predetermined quantity of recent shot-noise-reduced frames 322. A higher-accuracy Eigen image may be obtained by having a longer memory at the expense of slower response to variations in fixed pattern intensity. Equation 9 is an exemplary function for computing Eigen image 334, denoted as the Greek letter nu, ν.

$$\nu^t = \frac{I_f^t \cdot \lambda_N + \nu^{t-1}}{1 + \lambda_N} \quad \text{(Eq. 9)}$$

The result of Equation 9 is Eigen image 334 at time t averaged with a decay $\lambda_N$, (e.g., 0.001) from shot noise filtered image 322 ($I_f^t$). In an exemplary embodiment, Equation 9 is executed as a pixel-wise operation.

Figure 11:
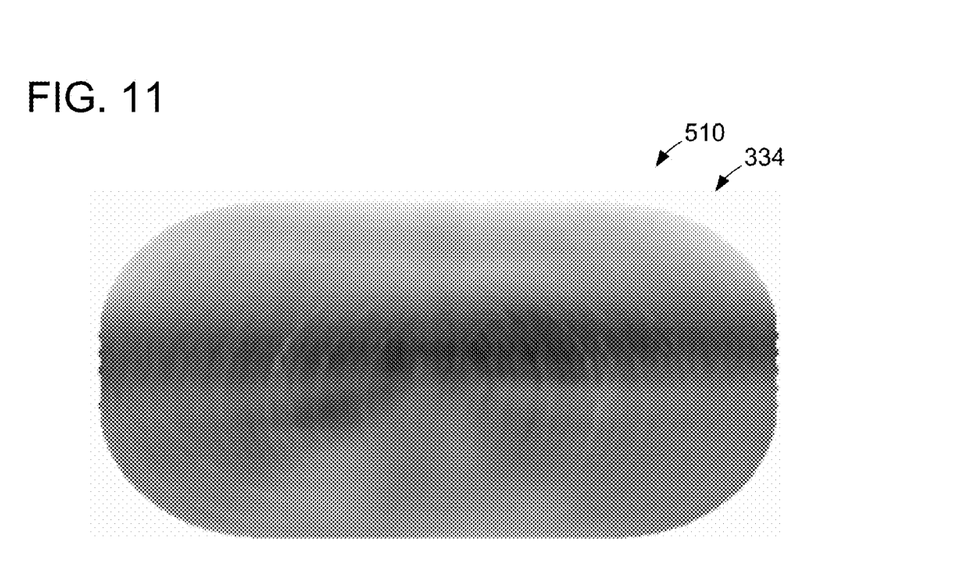
FIG. 11 is an exemplary image of fixed pattern noise in the image shown in FIG. 10.

FIG. 11 is an exemplary image 510 of fixed pattern noise in image 500. Referring also to FIG. 3, image 510 is an example of one Eigen image 334. As shown in FIG. 11, a significant amount of fixed pattern noise is identified and may thus be removed from shot-noise-reduced frame 322.

Figure 12:
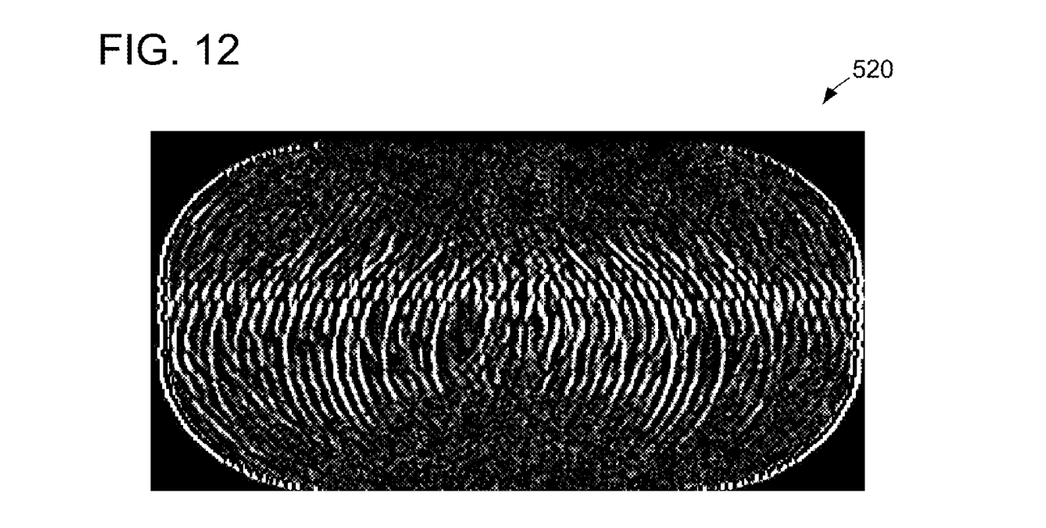
FIG. 12 is an exemplary image that may be produced by the discrete wavelet transform shown in FIG. 3 based on the image shown in FIG. 11.

In the exemplary embodiment, a discrete wavelet transform (DWT) 336 is used to further refine shot-noise-reduced frame 322. A symlet style wavelet may be used as the basis of DWT 336. The horizontal and diagonal components of DWT 336 may be discarded. FIG. 12 is an exemplary image 520 that may be produced by DWT 336 based on image 510. The vertical decomposition component $C_{vert}$ of DWT 336 shown in image 520 may be normalized (e.g., to fall between 0 and 1) and subtracted 338 from shot-noise-reduced frame 322. Additionally, to make the wavelet fit the fixed pattern noise, shot-noise-reduced frame 322 may be increased in size by a factor of 1.5. This produces a vertical wavelet component at a 1.5× scale relative to shot-noise-reduced frame 322, so the vertical wavelet component is reduced in size to match the scale of shot-noise-reduced frame 322.

Equation 10 is an exemplary function for subtracting the vertical DWT component $C_{vert}$ (e.g., as shown in image 520) from shot-noise-reduced frame 322 ($I_f^t$).

$$I_w^t = I_f^t - \{\|C_{vert}\| \cdot \Sigma - 0.5 \cdot [\max(\|C_{vert}\|\tau) - \min(\|C_{vert}\|\tau] - o\} \quad \text{(Eq. 10)}$$

In Equation 10, $I_f^t$ is the shot-noise filtered image 322. $C_{vert}$ is the resized vertical component of DWT 336. In the exemplary embodiment, $C_{vert}$ is normalized between 0 and 1. τ is a constant bias, and o is a constant offset. In the exemplary embodiment, τ is between 1.0 and 3.0 (e.g., equal to 2.0), and o is between −0.2 and 0.0 (e.g., equal to −0.1). The offset and bias values may cause the DWT image to range between −1 and 1, such that activated areas are subtracted and contra activated areas are added.

Figure 13:
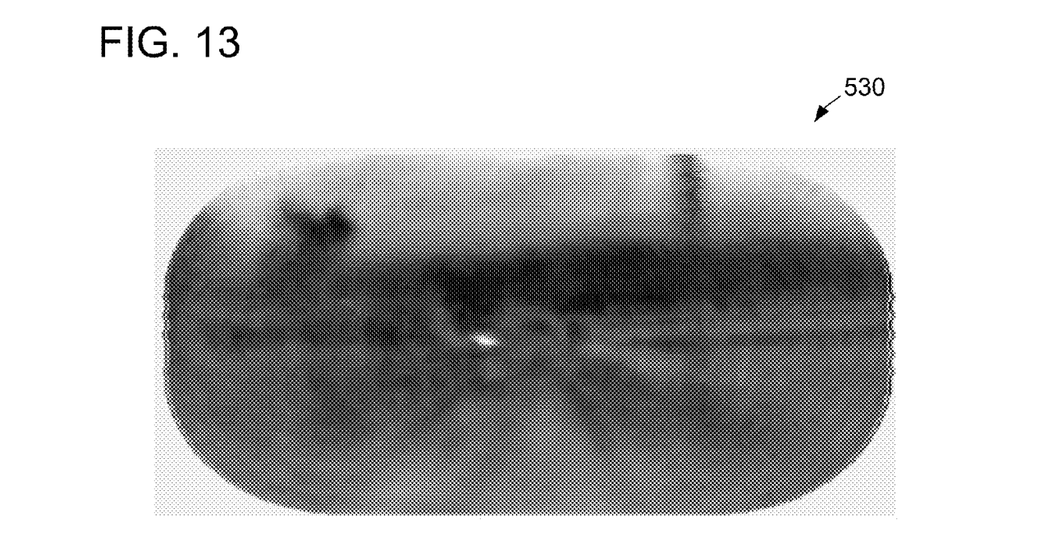
FIG. 13 is an exemplary image representing the output of the Eigen image wavelet transform process shown in FIG. 3 based on the image shown in FIG. 10.

FIG. 13 is an exemplary image 530 representing the output of EIWT process 330 (shown in FIG. 3) based on image 500 (shown in FIG. 10). Image 530 includes less fixed pattern noise than is included in image 500. Some fixed pattern noise, however, may remain. Accordingly, in some embodiments, non-uniformity correction (NUC) 332 is applied to image 530.

Referring to FIG. 3, in an exemplary embodiment, NUC 332 includes block motion estimation 340, which may be tailored for use with the methods described herein. For example, in the context of video from a PMMW sensor, a simple mean error subtraction may provide results that are superior to a least squares approximation. In the exemplary embodiment, NUC 332 operates on video frames, such as image 530 (shown in FIG. 13) produced by EIWT process 330.

As part of block motion estimation 340, input frames are low-pass filtered by a large Gaussian kernel. For example, the Gaussian kernel may be 21 pixels by 21 pixels. Further, a mean square error (MSE) criteria, as opposed to a sum of absolute differences (SAD) error, may be used for block matching in block motion estimation 340.

Block motion estimation 340 creates a motion shifted image that represents a prediction of an input frame based on the last frame and the motion in the image. Block motion estimation 340 may be useful in NUC 332 at least in part because portions of the input frame are uncorrupted by fixed pattern noise. When a pixel is shifted to a new location using block motion estimation 340, the expectation is that the pixel in the last frame shift should be the same as a pixel in the current frame. A difference in the pixels may signify distortion by fixed pattern noise. Accuracy of block motion estimation 340 may be enhanced by sampling multiple input frames and averaging the results.

NUC 332 may be computed only over the mean (bias) error, simplifying NUC 332 and facilitating real-time execution. In an exemplary embodiment, a basic Kalman filter is used to compute a running mean for the expected error between a pixel and its shifted prediction. Starting with the EIWT corrected image $I^t_w$, the error estimate is computed as the input observed pixel x minus the block motion estimated pixel z. Equation 11 is an exemplary function for determining an error estimate.

$$\epsilon = x - z \tag{Eq. 11}$$

A global root mean square error (RMSE) Q is calculated to determine the general error over all n pixels. Equation 12 is an exemplary function for determining RMSE Q.

$$Q = \sqrt{\frac{\sum \epsilon^2}{n-1}} \tag{Eq. 12}$$

A constant K is determined based on RMSE Q. Equation 13 is an exemplary function for determining K.

$$K = \frac{\hat{\sigma}^{t-1} + Q}{\hat{\sigma}^{t-1} + Q + V} \tag{Eq. 13}$$

The mean and variance of the error are updated 342 based on K. Equation 14 is an exemplary function for determining the mean of the error. Equation 15 is an exemplary function for determining the variance of the error.

$$\hat{\mu}^t = \hat{\mu}^{t-1} + K \cdot (\epsilon - \hat{\mu}^{t-1}) \tag{Eq. 14}$$

$$\hat{\sigma}^t = (1-K) \cdot \hat{\sigma}^{t-1} \tag{Eq. 15}$$

Figure 14:
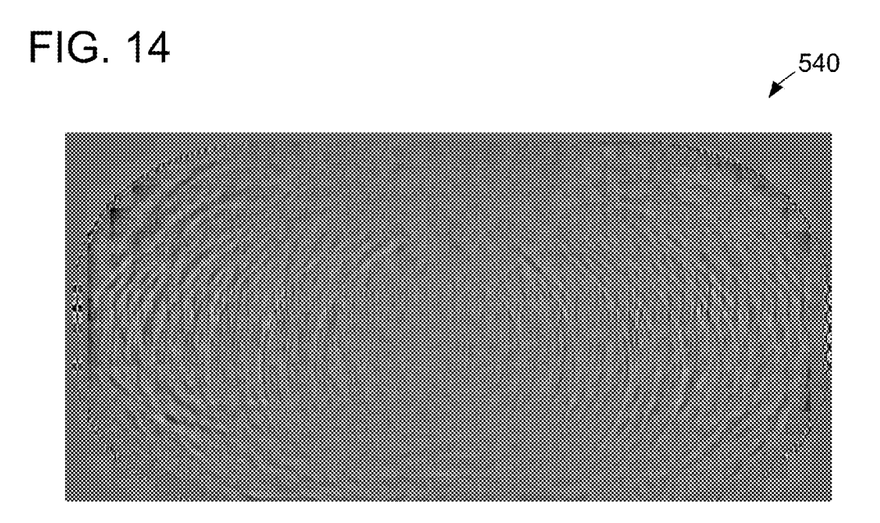
FIG. 14 is an exemplary image representing the mean of the error calculated by the non-uniformity correction shown in FIG. 3 based on the image shown in FIG. 13.

Values of $\hat{\mu}^t$ and/or $\hat{\sigma}^t$ may be stored as parameters 344 for use in a subsequent iteration of NUC 322. For example, these values may be used as t−1 terms in Equations 13-15. FIG. 14 is an exemplary image 540 representing the mean of the error, $\hat{\mu}^t$. Image 540 may be output by Equation 14.

Referring to FIG. 3, NUC compensation 346 is applied to each pixel of the input frame. Equation 16 is an exemplary function for performing NUC compensation 346 on a pixel by subtracting the estimated mean error from the value of the pixel.

$$i_n^t = x - \hat{\mu}^t \tag{Eq. 16}$$

In Equation 16, x is the value of a pixel from the EIWT corrected image $I_w^t$. In the exemplary embodiment, Equation 16 is applied to all pixels in the input frame $I_w^t$, and the resulting NUC compensated pixels $i_n^t$ are combined to create a final corrected frame 350, which is output 215 (shown in FIG. 2).

Performing NUC 332 as described in the exemplary embodiment facilitates increasing execution speed and reducing the artifacts inherent in the gain estimation. Further, while NUC 332 may primarily address noise that is based on a simple bias, some gain correction is inherent in the fact that NUC 332 is computed online.

Figure 15:
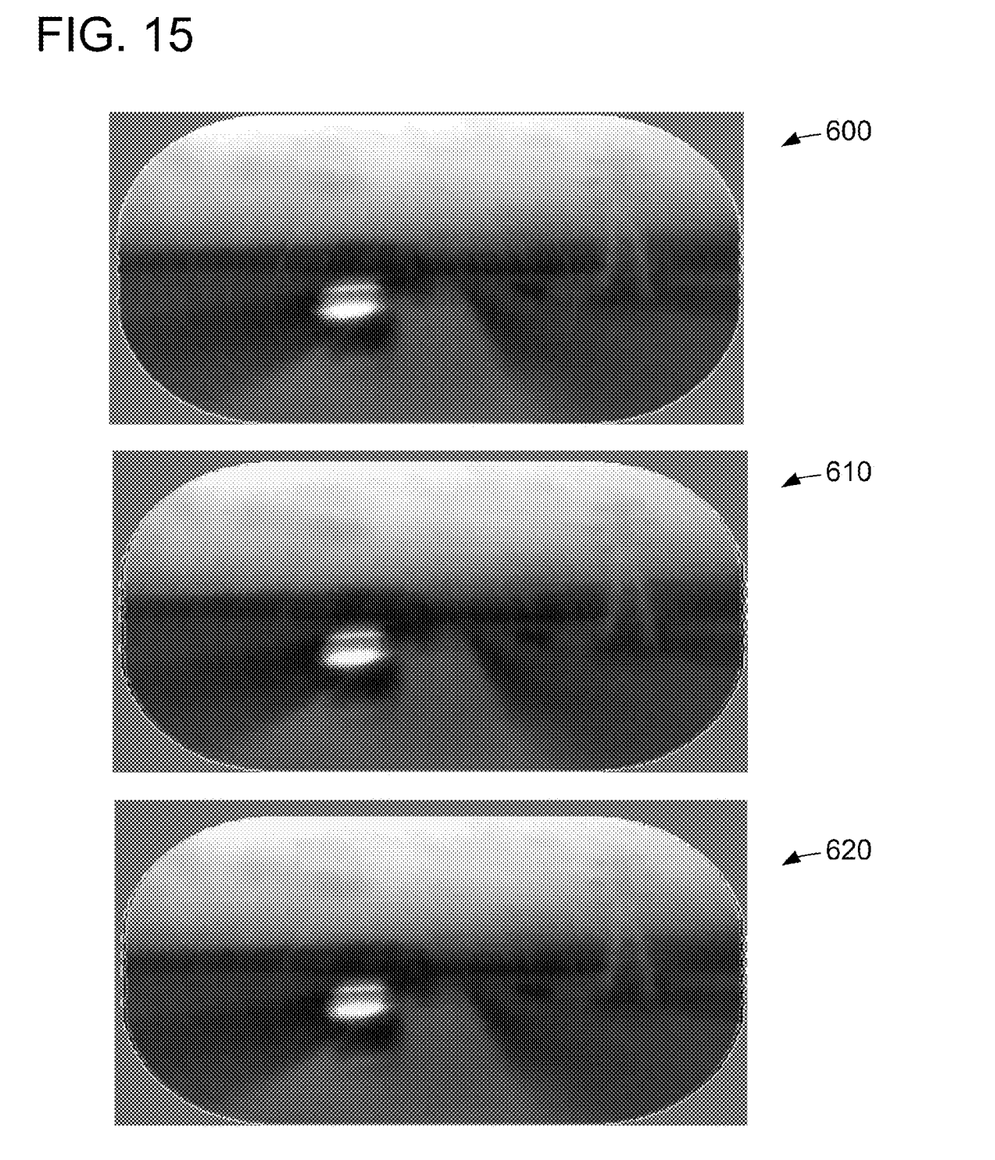
FIG. 15 is a series of frames including a shot noise filtered frame, an Eigen image wavelet transform corrected frame, and a non-uniformity correction compensated frame.

FIG. 15 is a series of frames including a shot noise filtered frame 600, an EIWT corrected frame 610, and an NUC compensated frame 620. As shown in FIG. 15, each succeeding image has less fixed pattern noise than the preceding image.

Referring again to FIG. 3, applying EIWT process 330 and NUC 332 in tandem may yield superior results than applying either by itself. This may be explained at least in part by the fact that EIWT process 330 does not require motion between frames in order to work well, although EIWT process 330 may perform better in a dynamic scene. Further, while EIWT process 330 can produce artifacts, NUC 332 may remove these artifacts well. For example, such artifacts may tend to be at high frequency, and NUC 332 may be especially effective at removing high frequency artifacts. Moreover, NUC 332 may enable removal of fixed pattern noise when motion is present, while EIWT process 330 may enable removal of fixed pattern noise in a quiescent scene.

Both EIWT process 330 and NUC 332 may be configured to learn weights and adapt online. The gains for adaptation may be somewhat small and require a longer period for learning. This can be partially offset by training initial weights on an exemplary video clip (e.g., a PMMW video clip) and then loading these as the starting weights for another clip. The primary fixed pattern items which can be trained and recalled are the Eigen Image for EIWT process 330 and the mean error in NUC 332. The space requirement for storage may be the size of the input frame for both. Because the algorithm adapts to the noise, fixed pattern noise reduction may become optimal after a short delay (e.g., less than five or ten seconds).

Embodiments described herein enable real-time, surprise-enhanced noise reduction in video generated from an imaging sensor, such as a passive millimeter wavelength (PMMW) sensor. Based on a calculation of Bayesian surprise, the response of one or more filters may be attenuated, facilitating reducing the severity of noise reduction artifacts (e.g., blurring) in areas where such artifacts may be most noticeable to a human or machine observer. Accordingly, real-time vehicle operation (e.g., piloting and/or targeting) may be facilitated in conditions that impair visual operation.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in reducing noise in a video that includes a series of frames, said method comprising:
   determining an expected value corresponding to each area of a plurality of areas within a first frame of the series of frames;
   calculating a surprise value associated with each area of the plurality of areas based at least in part on the expected value and an actual value corresponding to the area, wherein the surprise value represents a divergence of the actual value from the expected value;
   executing a fast gain filter process to the first frame by:
      applying a fast gain filter to the first frame, wherein the fast gain filter operates on gains of pixels in the first frame;
      attenuating a response of the fast gain filter with respect to a first area of the plurality of areas based on the surprise value associated with the first area; and
   applying a fixed pattern noise filter to the first frame by:
      applying an Eigen image wavelet transform to the first frame; and
      applying a non-uniformity correction to the first frame.

2. A method in accordance with claim 1, wherein attenuating the response of the fast gain filter with respect to the area of surprise comprises attenuating the response of the fast gain filter in proportion to the calculated surprise value.

3. A method in accordance with claim 1, further comprising determining an expected value corresponding to each area of the plurality of areas comprises based at least in part on a probability distribution function.

4. A method in accordance with claim 1, wherein the plurality of areas is a plurality of pixels, said method further comprising attenuating the response of the fast gain filter with respect to each pixel of the plurality of pixels based on a surprise value associated with the pixel.

5. A method in accordance with claim 1, further comprising receiving the plurality of frames from a passive millimeter wavelength sensor.

6. A method in accordance with claim 1, wherein the fast gain filter includes a high-pass filter, said method further comprising applying a temporal smoothing filter to the video.

7. A device for use in reducing noise in a video, said device comprising:
   a storage device configured to store a series of frames associated with the video, wherein each frame of the series of frames includes a plurality of pixels; and
   a processor unit coupled to said storage device and programmed to:
   calculate a surprise value associated with each pixel of the plurality of pixels in a first frame of the series of frames, wherein the surprise value represents a divergence of an actual value of the pixel from an expected value of the pixel;
   execute a fast gain filter process to the first frame by:
      applying a fast gain filter to the first frame, wherein the fast gain filter operates on gains of the pixels in the first frame;
      attenuating a response of the fast gain filter with respect to a first pixel of the plurality of pixels based on the surprise value associated with the first pixel; and
   apply a fixed pattern noise filter to the first frame by:
      applying an Eigen image wavelet transform to the first frame; and
      applying a non-uniformity correction to the first frame.

8. A device in accordance with claim 7, wherein said processor unit is programmed to attenuate the response of the fast gain filter in proportion to the surprise value.

9. A device in accordance with claim 7, wherein said processor unit is further programmed to calculate the expected value of each pixel based at least in part on a previous value of the pixel and a probability distribution function.

10. A device in accordance with claim 7, further comprising a passive millimeter wavelength (PMMW) sensor coupled to said processor unit, wherein said PMMW sensor is configured to provide the series of frames.

11. A device in accordance with claim 7, wherein the fast gain filter includes a high-pass filter, and said processor unit is further programmed to apply a temporal smoothing filter to the first pixel, wherein a response of the temporal smoothing filter is attenuated based on the surprise value.

12. A device in accordance with claim 7, wherein the fast gain filter includes a high-pass filter, and said processor unit is further programmed to apply a temporal smoothing filter to the first pixel, wherein a response of the temporal smoothing filter is attenuated based on a static mask.

13. One or more non-transitory computer readable media having computer-executable components, said components comprising:
   a fast gain filter component that when executed by at least one processor unit causes the at least one processor unit to calculate a shot noise mask representing noise within a video frame, wherein the shot noise mask includes a plurality of pixels corresponding to a plurality of pixels within the video frame, and wherein said fast gain filter component operates on gains of the plurality of pixels in the video frame; and
   an attenuation component that when executed by at least one processor unit causes the at least one processor unit to:
   calculate a surprise value associated with each pixel of the plurality of pixels in the video frame, wherein the surprise value represents a divergence of an actual value of the pixel from an expected value of the pixel;
   attenuate the shot noise mask based on the surprise values associated with the pixels within the video frame, wherein the attenuated noise mask is subtracted from the video frame to create a shot-noise-reduced frame;
   calculate a fixed pattern noise mask by applying an Eigen image wavelet transform and a non-uniformity correction to the shot-noise-reduced frame; and
   subtract the fixed pattern noise mask from the shot-noise-reduced frame.

14. One or more non-transitory computer readable media in accordance with claim 13, wherein said attenuation component, when executed by at least one processor unit, causes the at least one processor unit to calculate the surprise value associated with each pixel based at least in part on a previous value of the pixel, a probability distribution function, and a Kullback-Leibler divergence function.

15. One or more non-transitory computer readable media in accordance with claim 13, wherein said fast gain filter component, when executed by at least one processor unit, further causes the at least one processor unit to attenuate each pixel of the plurality of pixels within the shot noise mask by: creating a surprise mask representing the surprise value associated with each pixel within the video frame; and subtracting the surprise mask from the shot noise mask.

16. One or more non-transitory computer readable media in accordance with claim 13, wherein the fixed pattern noise mask is not attenuated based on the calculated surprise values.

17. One or more non-transitory computer readable media in accordance with claim 13, wherein said components further comprise a video acquisition component that when executed by at least one processor unit causes the at least one processor unit to receive a video frame from an imaging sensor, wherein the video frame includes a plurality of pixels.

* * * * *